William Bernstein
Robert Wax
INVENTORS

William Bernstein
Robert L. Wax
INVENTORS

United States Patent Office 3,435,214
Patented Mar. 25, 1969

3,435,214
NEUTRAL-ATOM DETECTOR
William Bernstein, Los Angeles, and Robert L. Wax, Manhattan Beach, Calif., assignors to TRW Inc., Redondo Beach, Calif., a corporation of Ohio
Filed Apr. 25, 1967, Ser. No. 633,627
Int. Cl. G01t 1/20
U.S. Cl. 250—71.5                                                   5 Claims

ABSTRACT OF THE DISCLOSURE

There is disclosed an apparatus for detecting an incident beam or flux of neutral atoms, such as hydrogen atoms, in the energy range from 1 to 20 kev. using a fixed geometry and yet obtaining both ultraviolet insensitivity and energy independence within the range of energies for which the apparatus is designed. By this is meant that where two incident fluxes are of equal intensity, they will be registered by the detector apparatus as equal irrespective of whether or not they have the same energy value. This is achieved by passing the incoming beam through a deflection system to remove charged particles, causing the remaining beam of neutral particles to be scattered by a thin foil, and positioning a detector for the scatered particles at a critical angle such that for that angle the relative scatter for particles of different energies within the design energy range is the same.

Background of the invention

The instrument disclosed herein accomplishes a direct measurement of the total neutral-hydrogen particle flux believed to exist in the solar wind and known to exist during auroral displays. Devices of the general type of that described herein, but using gas rather than a foil as the scattering element, have been used to detect more energitic neutral particles which arise in controlled thermonuclear plasma research. The present device, however, is able to detect particles in a lower energy range and is furthermore able to do so without using vacuum pumps or the like and in an environment where there is a large flux of ultraviolet light, as is the case in the aurora or the solar wind. Unlike prior art devices, the detector of the present invention is able to distinguish between relatively low energy neutral atoms and light. The present device is also such as to provide energy independence over the design range of energies, as well as ultra-violet insensitivity while using a fixed geometry to obviate moving parts or control circuits.

Summary of the invention

This is achieved by providing a detector apparatus comprising electro-static and magnetic deflection systems to remove charged particles from the incident beam, a thin foil on which the remaining beam of neutral particles is incident, and a detector fixed in a position somewhat offset from the axis of the incident beam so that neutral particles scattered by the thin foil will impinge on the detector. The critical angle of offset from the axis of the incident beam is empirically determined to afford energy independence in a manner described below, whereas the offset itself inherently provides insensitivity to ultra-violet rays which are not scattered by the foil.

Description of the preferred embodiments

Figure 2:
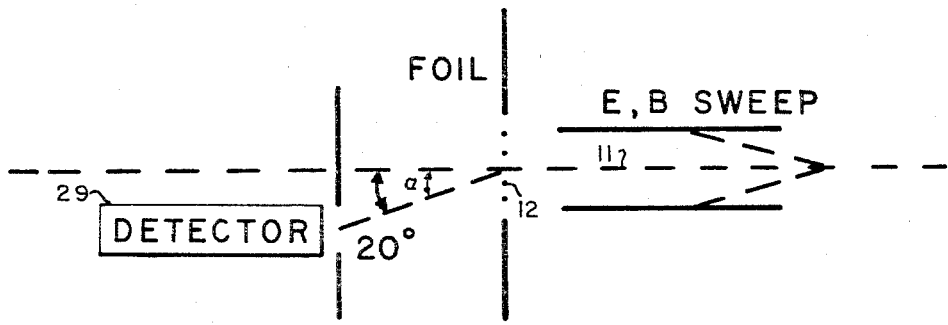
FIGURE 2 is a diagrammatic illustration of the principles of the present invention derivable from the data of FIGURE 1.
Figure 1:
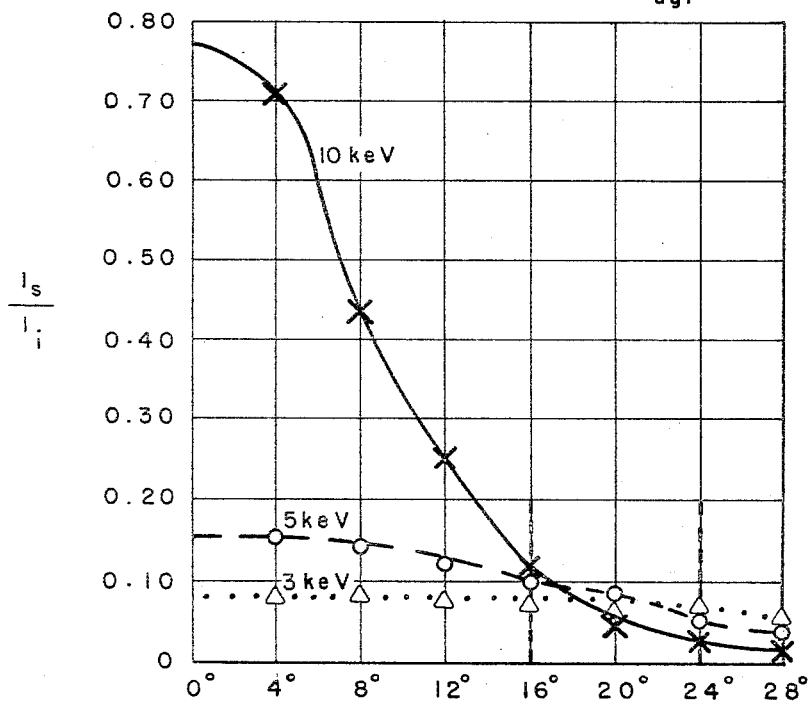
FIGURE 1 is a chart plotting empirically obtained data wherein the relative scatter of neutral hydrogen particles by a thin foil is plotted as ordinate as a function of the angle of scatter plotted as abscissa for three curves each indicating a respective energy level of incident particles.

Turning now to the drawings, there is shown in FIGURE 1 a graph in which there is plotted the relative scatter as measured on the ordinate or vertical axis as a function of any given angle of scatter, as measured on the abscissa or horizontal axis, for a neutral hydrogen atom when penetrating a foil of nominal thickness of two micrograms per square centimeter. The foil, which is indicated schematically by the dotted line in the schematic diagram of FIGURE 2, is preferably composed of carbon which has been deposited as a foil by evaporation. In FIGURE 1, each of the three curves is a plot of the relative scatter as a function of angle of scatter for neutral hydrogen particles having the energy specified in the legend for each curve.

Thus, it has been found as indicated by the solid line bearing the 10 kev. legend, that neutral hydrogen particles having an energy of 10 kev. will have a distribution of angle of scatter such as is indicated by the solid line curve. On the other hand, the distribution of the angle of scatter for 5 kev. neutral hydrogen particles is indicated by the dashed line and the distribution of the angle of scatter for 3 kev. is indicated by the dotted line. It has been empirically determined as is indicated by these graphical results that at an angle of approximately 20°, the three curves have a substantially common intersection point, as can be seen from observing the measured points indicated by the cross, the circle and the triangle, respectively, at the 20° point.

It follows from the fact that the three curves intersect at the 20° point that if a detector such as is indicated by block 29 in FIGURE 2 is positioned at an angle (alpha), which here has a value of 20°, offset from the axis of the incident stream of particles 11 and positioned in back of the foil 12, the percentage of particles incident on the foil which actually strike the detector will be the same for each of the three energies. That is to say, approximately 7½ percent of the incident neutral hydrogen atoms will be deflected through an angle of 20° and will thus strike the detector which is positioned at this angle, irrespective of whether the incident particles have energies of 3, 5, or 10 kev. In fact, it has also been determined that this relationship holds true for any intermediate value within the range of 1–20 kev. It is thus apparent that the detector can be calibrated to afford an accurate measure of the intensity of the incident flux which is independent of the energy of the incident particles within the range of energies for which the instrument is designed to operate.

As noted above, this instrument was designed to accomplish a direct measurement of the total neutral hydrogen flux believed to exist in the solar wind and known to exist during auroral displays. Similar devices also, of course, have utility in controlled thermonuclear plasma research and other particle studies. The carbon foil which, in the preferred embodiment, was one centimeter in diameter and two micrograms per square centimeter thick, was mounted on a grid structure in order to give a firm physical support to the foil and the detector was a CsI scintillation crystal 0.5 centimeter high and three centimeters wide, mounted at a position 3.5 centimeters behind the foil and displaced 1.5 centimeters vertically from the center of the foil. This configuration was designed specially to detect neutral hydrogen atoms, but by changing the one centimeter displacement, one can obtain the results described below for other neutral atoms. In a manner which will be illustrated in greater detail below, a photo multiplier tube is used to detect the flux of neutrals which has been scattered by the foil and which impinges on the CsI crystal. The crystal and phototube could, of course, be replaced by any other suitable detection apparatus such as a secondary emission detector in order to increase the efficiency of the device or widen the energy response of the detector. It is, in all cases essential, however, that a foil no thicker than the two micrograms per square centimeter as disclosed herein be used for efficient detection of low energy particles by equal angle scattering within the energy range.

Figure 3:
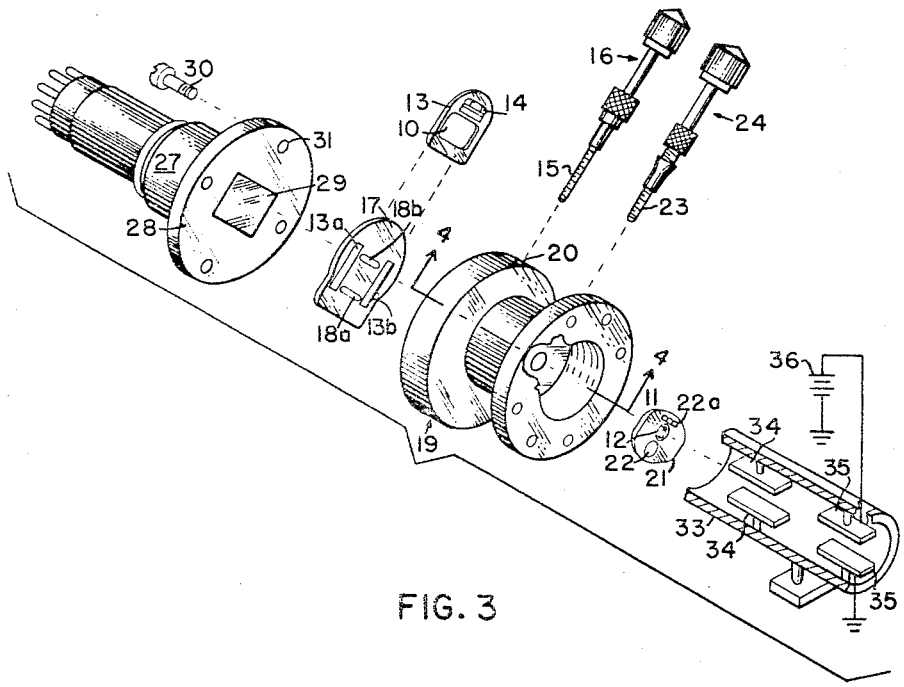
FIGURE 3 is an exploded perspective view of a detailed physical embodiment of the detector.

There is shown in FIGURES 2 and 3 a detailed physical embodiment of the detector, wherein the CsI scintillation crystal detector 29, which is to be positioned to receive the particles from the beam 11 scattered by the carbon foil 12, is mounted in a plate 28. A shutter plate 13 is provided with a protruding bracket and nut arrangement 14 which is adapted to receive the threaded end 15 of a pin 16. The plate 13 has an aperture 10 and is slidably mounted in guides 13a and 13b protruding from a slotted plate 17 which has openings or slots 18a and 18b therein. The plate 17 is mounted in a recess in a generally cylindrical housing 19 by means of a secure fit in a recess in the housing. The pin 16 is received in a threaded hole 20 in the housing 19 and projects downwardly into the hollow interior of cylindrical housing 19 to be threadedly received by the nut 14 on mounting plate 13. Motion of the pin up and down in the hole 20 will thus move the plate 13 up and down in the guides 16. Aperture 10 may thus be caused to expose either slot 18a, which is at the critical 20° angle or slot 18b, which is positioned in line with the undeflected beam axis 11. Thus, the single crystal 29 serves essentially as two detectors, the portion of the crystal exposed by slot 18a being the one with 20° offset and the portion exposed by 18b serving for calibration purposes.

The thin carbon foil 12 is mounted in a fashion somewhat similar to the mounting of the detector. The edge ring mounted foil 12 is seated in a first aperture in a plate 21, which has a protruding nut 22 thereon to receive the threaded end 23 of a pin 24, which in turn passes through a hole 25 in the cylindrical housing 19. The mounting plate 21 for foil 12 is also provided with a second aperture 22. By proper adjustment of the pin 24, either the foil 12 or the empty aperture 22 can be brought into alignment with an aperture 25 in an interior partition 26 of the cylindrical housing 19. Of course, in an operative condition, the foil 12 is positioned by pin 24 to be in alignment with the incoming flux axis which in turn passes through the aperture 25. It is, however, sometimes convenient to permit the entire flux beam to pass through the aperture 22 and 25 without scattering for calibration or other purposes.

As will be apparent from FIGURES 2 and 3, a phototube 27 or other convenient device for registering the output of detector 29 is mounted on a plate 28 in such a fashion that its input element is exposed to the output of the detector 29. The plate 28 in turn is mounted to the cylindrical housing 19 by machine screws 30 which are received in apertures 31 of the plate 29 and which, in turn seat in the end face of the cylindrical housing 19. The power supply to the photo tube 27 and the output signal therefrom is taken from conventional connector pins 32 on tube 27.

Figure 4:
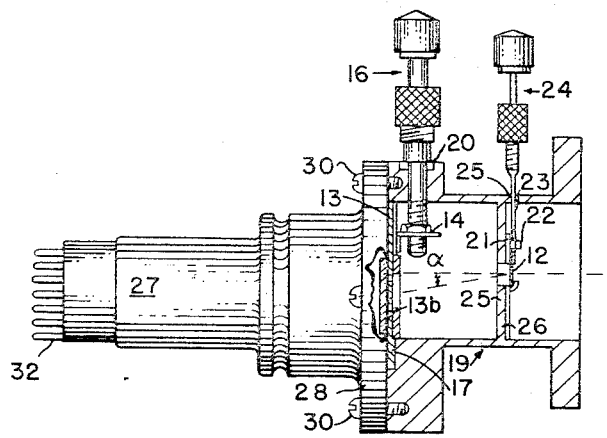
FIGURE 4 is an elevational view partly in section on line 4—4 of FIGURE 3 showing the detector of FIGURE 3 in assembled form.

As is shown in FIGURE 3, a deflection system is provided by mounting within a cylindrical or tubular housing 33 a first pair 34 of magnetic plates which may preferably be of the rubber magnet variety, and a second pair of electrostatic deflection plates 35. The plates 34 and 35 in each pair are mounted on appropriate studs protruding from the cylindrical housing. Of course, the electrostatic deflection plates 35 must be connected to a source 36 of electrostatic potential in any convenient and conventional manner. The cylindrical housing 33 may, if desired, be open on one side and is preferably adapted to be received in the front opening of the cylindrical housing 19. This electrostatic and magnetic deflection system, as is schematically indicated in FIGURE 3, but for the purposes of clarity, is omitted from FIGURE 4 since this is a conventional feature of apparatus of this type.

In operation, a beam 11 of neutral hydrogen atoms in the energy range of 1–20 kev. is incident on the foil 12 and is scattered in its transit through the foil. If one starts with a pencil beam of neutrals, the beam emerging from the foil will be divergent and the detector 10 is arranged so that for equal incident fluxes of hydrogen atoms within the 1–20 kev. range, it will detect equal fluxes of scattered atoms. That is to say, the detection of hydrogen is independent of energy in the range 1 to 20 kev. By changing the placement of the detector or its shutter slot relative to the foil, one can obtain this type of energy independence for a neutral beam consisting of any atomic species. As noted above in connection with the discussion of FIGURES 1 and 2, it has been found that for the detection of neutral hydrogen atoms in the range of 1 to 20 kev. an angle (alpha), of offset of the detector from the incident beam axis of 20° affords the desired results.

It is apparent that in an environment where there is a large flux of ultra violet light, as is the case in the aurora or solar wind, the present device is able to distinguish between neutral atoms and light because the light will not be scattered by the foil, but rather, depending upon its exact wavelength, will either be absorbed by the foil or will be transmitted to continue along the axis 11 of the incident flux. The atoms, on the other hand, are deflected for detection by the offset detector 10. Furthermore, as noted above, where the critical angle of offset for the particle to be detected is used, the detector can be calibrated to be independent of th energy of the incident particle in the intended range of operation. It should be noted that in passing through the foil, a fraction of the originally neutral particles will become charged. In the embodiment shown, this has no effect since the crystal registers both charged and uncharged particles alike. It is apparent, however, that the apparatus could readily be modified by replacing the detector with a spectrometer which would receive a maximum of the charged particles for measurement of the energy spectrum.

The device is extremely simple involving only the relative placement of the foil and the detector, and has no moving parts or calibration circuitry to fail. The device can be flown in a rocket payload for atmospheric or solar measurement or adapted for laboratory or other terrestrial uses. The range of operation and efficiency of the device is, of course, determined by the particular geometry and the nature of the output circuitry. In any modification, however, the use of a fixed geometry as taught herein will afford both ultraviolet insensitivity and energy independence, in an energy range as low as 1 kev.

While a specific preferred embodiment of the invention has been described by way of illustration only, it will be understood that the invention is capable of many other specific embodiments and modifications and is defined solely by the following claims.

What is claimed is:
1. A neutral particle detector comprising:
 (a) a thin foil positioned transversely to the axis of a beam of particles to be detected;
 (b) a deflection system positioned forwardly of said foil to remove incident charged particles from said beam before they strike said foil;
 (c) detection means offset from said axis and positioned rearwardly of said foil to receive atoms scattered by said foil and to be unaffected by light passing through said foil along said axis;

(d) said detector and said foil being so positioned with respect to each other geometrically that equal incident fluxes of atoms in a predetermined energy range striking said foil will produce equal fluxes of scattered atoms striking said detector for any specific value of energy within said predetermined range.

2. Apparatus as in claim 1 wherein:
said particles to be detected are neutral hydrogen atoms in the energy range of one kiloelectron volt to twenty kiloelectrons volts; said foil is one centimeter in diameter and consists of carbon having a thickness of two micrograms per square centimeter; and said detector is mounted 3.5 centimeters rearwardly of said foil and offset from said axis by 1 centimeter.

3. Apparatus as in claim 1 wherein:
said detector is a cesium iodide scintillation crystal 0.5 centimeter high and 3 centimeters wide; and wherein said apparatus further includes a photomultiplier tube positioned to measure the scintillation output of said crystal as an indirect measure of the magnitude of the scattered flux striking said crystal.

4. Means for detecting and measuring a flux of neutral particles within a predetermined energy range comprising:
(a) carbon foil means, the thickness of said foil being not more than two micrograms per square centimeter, said foil either absorbing or transmitting ultraviolet light without deflection or scattering, but being effective to scatter said beam of particles;
(b) means to position said carbon foil transversely to the path of said beam of particles to be detected;
(c) detector means offset from said path of said beam and positioned to receive a portion of the particles scattered by said foil;
(d) the angle of offset of said detection means from said paths being such that a predetermined constant percentage of scattered particles is incident on said detector for a particle beam having any given energy within said predetermined energy range whereby said detector is insensitive to light and measures the flux of said beam independently of the energy of said particles.

5. Apparatus as in claim 4 wherein:
said particles to be detected are neutral hydrogen and said angle of offset is 20°.

References Cited

UNITED STATES PATENTS 3,136,908   6/1964   Weinman _____ 250—41.9 X

RALPH G. NILSON, *Primary Examiner.*

A. B. CROFT, *Assistant Examiner.*

U.S. Cl. X.R.

250—41.3, 41.9